(12) United States Patent
Gu et al.

(10) Patent No.: US 9,916,039 B2
(45) Date of Patent: Mar. 13, 2018

(54) SHIFT REGISTER UNIT, ITS DRIVING METHOD, GATE DRIVER CIRCUIT AND DISPLAY DEVICE

(71) Applicants: BOE TECHNOLOGY GROUP CO., LTD., Beijing (CN); HEFEI BOE OPTOELECTRONICS TECHNOLOGY CO., LTD., Hefei (CN)

(72) Inventors: Honggang Gu, Beijing (CN); Xiaohe Li, Beijing (CN); Xianjie Shao, Beijing (CN); Bo Liu, Beijing (CN); Jie Song, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 24 days.

(21) Appl. No.: 15/205,860

(22) Filed: Jul. 8, 2016

(65) Prior Publication Data

US 2017/0108989 A1  Apr. 20, 2017

(30) Foreign Application Priority Data

Oct. 15, 2015  (CN) .......................... 2015 1 0670955

(51) Int. Cl.
| | |
|---|---|
| *G06F 3/041* | (2006.01) |
| *G09G 3/36* | (2006.01) |
| *G09G 3/20* | (2006.01) |

(52) U.S. Cl.
CPC .......... *G06F 3/0418* (2013.01); *G06F 3/0412* (2013.01); *G09G 3/2092* (2013.01);
(Continued)

(58) Field of Classification Search
CPC combination set(s) only.
See application file for complete search history.

(56) References Cited

U.S. PATENT DOCUMENTS

2008/0048712 A1* 2/2008 Ahn ..................... G09G 3/3677
326/21
2010/0207928 A1 8/2010 Lee et al.
(Continued)

FOREIGN PATENT DOCUMENTS

| CN | 103943055 A | 7/2014 |
|---|---|---|
| CN | 104078017 A | 10/2014 |

(Continued)

OTHER PUBLICATIONS

First Office Action regarding Chinese Application No. 201510670955.2, dated Mar. 21, 2017. Translation provided by Dragon Intellectual Property Law Firm.
(Continued)

*Primary Examiner* — Carolyn R Edwards
*Assistant Examiner* — Sosina Abebe
(74) *Attorney, Agent, or Firm* — Harness, Dickey & Pierce, P.L.C.

(57) ABSTRACT

The present disclosure provides a shift register unit, its driving method, a gate driver circuit and a display device. The shift register unit includes a pull-up circuit configured to pull up a potential at the pull-up node PU in accordance with a starting signal from a starting signal input end, a pull-down circuit configured to pull down the potential at the pull-up node in accordance with a resetting signal from a resetting signal input end, a first capacitor configured to bootstrap the potential at the pull-up node at a pull-up stage, a first noise reduction circuit configured to perform noise reduction on a signal from the output end of the shift register unit at a pull-down stage and a compensation circuit configured to compensate for the potential at the pull-up node at a touch stage in accordance with a touch switch signal from a touch switch end.

18 Claims, 7 Drawing Sheets

(52) U.S. Cl.
CPC ... *G09G 3/3648* (2013.01); *G09G 2300/0426* (2013.01); *G09G 2310/0251* (2013.01); *G09G 2310/0267* (2013.01); *G09G 2310/0283* (2013.01); *G09G 2310/0286* (2013.01); *G09G 2310/08* (2013.01); *G09G 2330/06* (2013.01)

(56) References Cited

U.S. PATENT DOCUMENTS

| | | |
|---|---|---|
| 2015/0371716 A1 | 12/2015 | Shao et al. |
| 2016/0180964 A1* | 6/2016 | Hu .................... G11C 19/28 345/100 |
| 2016/0225336 A1 | 8/2016 | Gu et al. |
| 2016/0274713 A1 | 9/2016 | Zhang et al. |

FOREIGN PATENT DOCUMENTS

| | | |
|---|---|---|
| CN | 104575429 A | 4/2015 |
| KR | 20150071541 A | 6/2015 |

OTHER PUBLICATIONS

Second Office Action regarding Chinese Application No. 201510670955.2, dated Sep. 14, 2017. Translation provided by Dragon Intellectual Property Law Firm.

* cited by examiner

SHIFT REGISTER UNIT, ITS DRIVING METHOD, GATE DRIVER CIRCUIT AND DISPLAY DEVICE

CROSS-REFERENCE TO RELATED APPLICATION

The present application claims a priority of the Chinese Patent Application No. 201510670955.2 filed on Oct. 15, 2015, which is incorporated herein by reference in its entirety.

TECHNICAL FIELD

The present disclosure relates to the field of display technology, in particular to a shift register unit, its driving method, a gate driver circuit and a display device.

BACKGROUND

Along with the development of the flat-panel display, a panel with a high resolution and a narrow bezel has become a mainstream. In order to acquire the panel with a high resolution and a narrow bezel, the commonest way is to integrate a gate driver circuit onto the panel.

A touch panel has been gradually used as a main input device in our daily lives. Currently, various input devices may be used for a computer system, such as mouse, button, touch panel and joystick. However, due to the usability, multi-functionality, declining price and increased yield, the touch panel has become more and more popular The touch panel may include an Add-on touch panel and an Add-in touch panel. For the Add-on touch panel, a panel having a touch function may be located in front of a display panel, and a touch surface of panel may cover a visible region of a display region, so as to achieve the touch function. For the Add-in touch panel, the touch function is integrated into the display panel, with or without any cover glass on the display panel. The panel may be touched by a finger, so as to achieve the touch function. The Add-in touch panel may include a complete Add-in touch panel and a hybrid Add-in touch panel. For the hybrid Add-in touch panel, parts of touch electrodes (e.g., driving electrodes) are formed between an array substrate and a color filter substrate, while another parts of the touch electrodes (e.g., sensing electrodes) are formed on the color filter substrate. For the complete Add-in touch panel, the touch electrodes (including both the driving electrodes and the sensing electrodes) are formed between the array substrate and the color filter substrate.

Driver circuits for a liquid crystal display device mainly include a data driver circuit and a gate driver circuit. For the gate driver circuit, each gate line is connected to a shift register unit. A gate input signal is outputted by the gate driver circuit, so as to scan pixels progressively. For the Add-in touch panel, the touch electrode is located very close to a gate electrode, the gate line and a data line, so a touch signal and a display signal may interfere with each other in the case that a touch operation and a display operation are performed simultaneously. As a result, it is impossible to perform the touch operation or the display operation normally.

SUMMARY

An object of the present disclosure is to provide a shift register unit, its driving method, a gate driver circuit and a display device, so as to prevent the mutual interference between touch driving and display driving for an Add-in touch panel, thereby to enable the touch driving and the display driving to be compatible with each other.

In one aspect, the present disclosure provides in some embodiments a shift register unit, including a pull-up circuit, a pull-down circuit, a first capacitor, a first noise reduction circuit, and a compensation circuit. First ends of the pull-up circuit, the pull-down circuit, the first noise reduction circuit, the compensation circuit and the first capacitor are connected to a pull-up node, and second ends of the pull-up circuit, the first noise reduction circuit and the first capacitor are connected to an output end of the shift register unit. The pull-up circuit is configured to pull up a potential at the pull-up node PU in accordance with a starting signal from a starting signal input end. The pull-down circuit is configured to pull down the potential at the pull-up node in accordance with a resetting signal from a resetting signal input end. The first capacitor is configured to bootstrap the potential at the pull-up node at a pull-up stage. The first noise reduction circuit is configured to perform noise reduction on a signal from the output end of the shift register unit at a pull-down stage. The compensation circuit is configured to compensate for the potential at the pull-up node at a touch stage in accordance with a touch switch signal from a touch switch end.

Alternatively, the shift register unit further includes a second noise reduction circuit connected to the first noise reduction circuit and the output end of the shift register unit, and configured to perform noise reduction on the signal from the output end of the shift register unit at the touch stage in accordance with the touch switch signal from the touch switch end.

Alternatively, the compensation circuit includes an eighth transistor and a ninth transistor, a gate electrode and a first electrode of the ninth transistor are connected to the pull-up node, a second electrode of the ninth transistor is connected to a second electrode of the eighth transistor, and a gate electrode and a first electrode of the eighth transistor are connected to the touch switch end.

Alternatively, the second noise reduction circuit includes a fourth transistor, a gate electrode of which is connected to the touch switch end, a first electrode of which is connected to the output end of the shift register unit, and a second electrode of which is connected to a second potential signal input end.

Alternatively, the pull-up circuit includes a first transistor and a third transistor, a gate electrode of the first transistor is connected to the starting signal input end, a first electrode of the first transistor is connected to a first potential signal input end, a second electrode of the first transistor is connected to the pull-up node, a gate electrode of the third transistor is connected to the pull-up node, a first electrode of the third transistor is connected to a clock signal end, and a second electrode of the third transistor is connected to the output end of the shift register unit.

Alternatively, the pull-down circuit includes a second transistor, a gate electrode of which is connected to the resetting signal input end, a first electrode of which is connected to a third potential signal input end, and a second electrode of which is connected to the pull-up node.

Alternatively, the first noise reduction circuit includes a second capacitor, a fifth transistor, a sixth transistor and a seventh transistor, a first end of the second capacitor is connected to the clock signal end, a second end of the second capacitor is connected to a gate electrode of the fifth transistor, a gate electrode of the seventh transistor and a first electrode of the sixth transistor at a pull-down node PD, a first electrode of the fifth transistor is connected to the output end of the shift register unit, a gate electrode of the sixth transistor is connected to the pull-up node, a first electrode of the seventh transistor is connected to the pull-up node, and a second electrode of the fifth transistor, a second transistor of the sixth transistor and a second transistor of the seventh transistor are connected to the second potential signal input end.

In another aspect, the present disclosure provides in some embodiments a gate driver circuit, including multiple levels of the above-mentioned shift register units. A resetting signal input end of a current-level shift register unit is connected to an output end of a next-level shift register unit, and a starting signal input end of the current-level shift register unit is connected to an output end of a previous-level shift register unit.

Alternatively, a starting signal input end of a first-level shift register unit and a resetting signal input end of a last-level shift register unit are connected to a triggering signal input end, and the triggering signal input end is configured to input a starting triggering signal to the starting signal input end of the first-level shift register unit and input a resetting triggering signal to the resetting signal input end of the last-level shift register unit.

Alternatively, during backward scanning, the starting signal input end of the shift register unit is configured to input a resetting signal, the resetting signal input end of the shift register unit is configured to input a starting signal, and potentials inputted by a first potential signal input end and a second potential signal input end are each of a phase reverse to those during forward scanning.

In yet another aspect, the present disclosure provides in some embodiments a display device including the above-mentioned gate driver circuit.

In still yet another aspect, the present disclosure provides in some embodiments a method for driving a shift register unit which includes a pull-up circuit, a pull-down circuit, a first capacitor, a first noise reduction circuit and a compensation circuit, including steps of: at a first stage, charging, by the pull-up circuit, the first capacitor in accordance with a starting signal from a starting signal input end, so as to pull up a potential at a pull-up node; at a second stage, after the charging, bootstrapping, by the first capacitor, the potential at the pull-up node continuously, and pulling up, by the pull-up circuit, a signal from an output end of the shift register unit continuously; at a third stage, pulling down, by the pull-down circuit, the potential at the pull-down node in accordance with a resetting signal from a resetting signal input end; at a fourth stage, performing, by the first noise reduction circuit, noise reduction on a signal from the output end of the shift register unit; and at a touch stage, compensating, by the compensation circuit, for the potential at the pull-up node in accordance with a touch switch signal from a touch switch end, so as to maintain the potential at the pull-up node.

Alternatively, the shift register unit further includes a second noise reduction circuit, and at the touch stage, the method further includes performing, by the second noise reduction circuit, the signal from the output end of the shift register unit in accordance with the touch switch signal from the touch switch end, so as to prevent the output end of the shift register unit from outputting a driving signal.

Alternatively, after the end of the fourth stage, the method further includes, at a fifth stage, inputting, by a clock signal end, a low level signal so as to pull down a pull-down node to be at a low level.

Alternatively, the method further includes, before a next frame, repeating the operations at the fourth stage and the fifth stage by the shift register unit.

Alternatively, at the touch stage, the method further includes compensating, by the compensation circuit, for the potential at the pull-up node in accordance with the touch switch signal from the touch switch end, so as to maintain the potential at the pull-up node.

Alternatively, the step at the touch stage is performed between scanning processes for two adjacent frames.

Alternatively, the step at the touch stage is performed between the steps at the first stage and the second stage during a driving process for any one of the shift register units within one frame.

Alternatively, the step at the touch stage is performed between the steps at the second stage and the third stage during a driving process for any one of the shift register units within one frame.

According to the shift register unit in the embodiments of the present disclosure, the compensation circuit may be used to compensate for the potential at the pull-up node at the touch stage, so as to maintain the potential at the pull-up node at the touch stage. After the end of the touch stage, the scanning process may be performed, so as to prevent the mutual interference between a touch signal and a display signal, thereby to achieve a touch operation and a display operation normally. As a result, it is able to prevent the mutual interference between touch driving and display driving for the Add-in touch panel, thereby to enable the touch driving and the display driving to be compatible with each other.

According to the gate driver circuit in the embodiments of the present disclosure, through the shift register unit, it is able to prevent the mutual interference between touch driving and display driving for the Add-in touch panel, thereby to enable the touch driving and the display driving to be compatible with each other.

According to the display device in the embodiments of the present disclosure, through the gate driver circuit, it is able to prevent the mutual interference between touch driving and display driving for the Add-in touch panel, thereby to enable the touch driving and the display driving to be compatible with each other.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
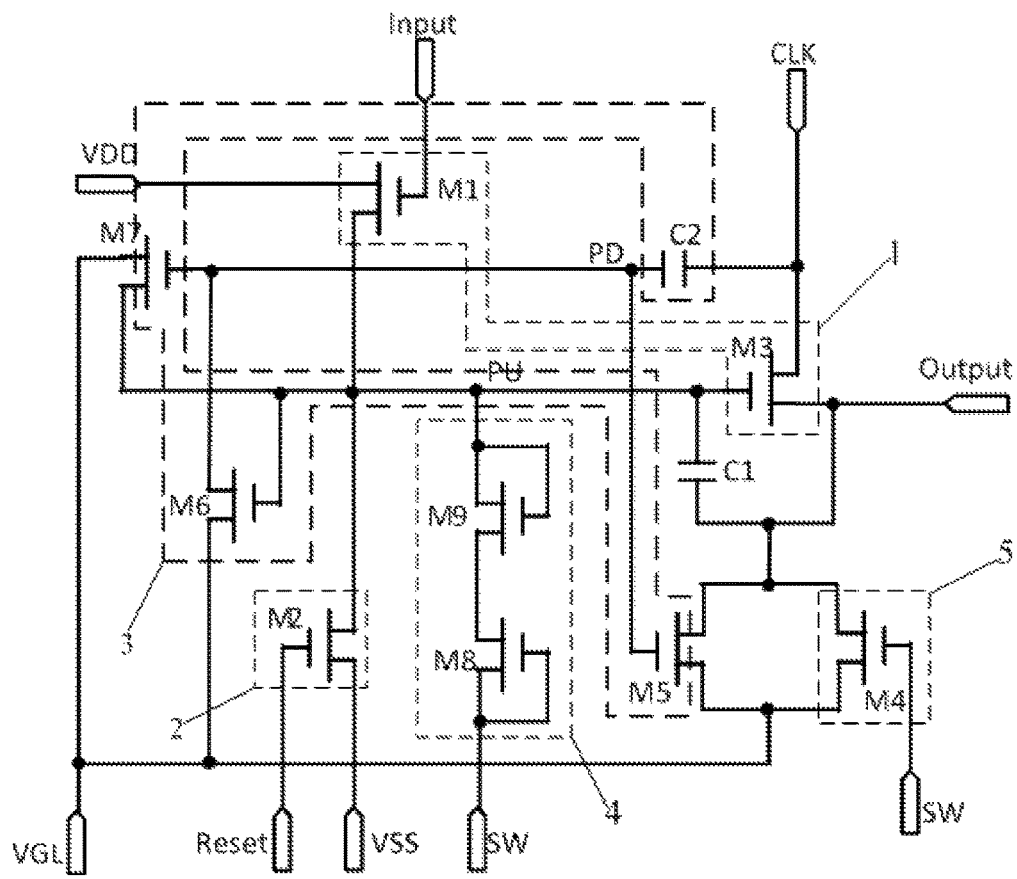
FIG. 1 is a circuit diagram of a shift register unit according to one embodiment of the present disclosure.

The present disclosure provides in some embodiments a shift register unit which, as shown in FIG. 1, includes a pull-up circuit 1, a pull-down circuit 2, a first capacitor C1, a first noise reduction circuit 3, and a compensation circuit 4. First ends of the pull-up circuit 1, the pull-down circuit 2, the first noise reduction circuit 3, the compensation circuit 4 and the first capacitor C1 are connected to a pull-up node PU, and second ends of the pull-up circuit 1, the first noise reduction circuit 3 and the first capacitor C1 are connected to an output end Output of the shift register unit. The pull-up circuit 1 is configured to pull up a potential at the pull-up node PU in accordance with a starting signal from a starting signal input end Input. The pull-down circuit 2 is configured to pull down the potential at the pull-up node in accordance with a resetting signal from a resetting signal input end Reset. The first capacitor C1 is configured to bootstrap the potential at the pull-up node PU at a pull-up stage. The first noise reduction circuit 3 is configured to perform noise reduction on a signal from the output end Output of the shift register unit at a pull-down stage. The compensation circuit 4 is configured to compensate for the potential at the pull-up node PU at a touch stage in accordance with a touch switch signal from a touch switch end SW.

According to the shift register unit in the embodiments of the present disclosure, the compensation circuit 4 may be used to compensate for the potential at the pull-up node PU at the touch stage, so as to maintain the potential at the pull-up node PU at the touch stage. After the end of the touch stage, the scanning process may be performed. As a result, it is able to prevent the mutual interference between a touch signal and a display signal, thereby to perform a touch operation and a display operation normally.

In some embodiments of the present disclosure, the shift register unit further includes a second noise reduction circuit 5 connected to the first noise reduction circuit 3 and the output end Output of the shift register unit, and configured to perform noise reduction on the signal from the output end Output of the shift register unit at the touch stage in accordance with the touch switch signal from the touch switch end SW. Through the second noise reduction circuit 5, it is able to prevent the output end Output of the shift register unit from outputting any signal at the touch stage, thereby to further prevent the mutual interference between the touch signal and the display signal at the touch stage.

In some embodiments of the present disclosure, the compensation circuit 4 includes an eighth transistor M8 and a ninth transistor M9, a gate electrode and a first electrode of the ninth transistor M9 are connected to the pull-up node PU, a second electrode of the ninth transistor M9 is connected to a second electrode of the eighth transistor M8, and a gate electrode and a first electrode of the eighth transistor M8 are connected to the touch switch end SW.

In some embodiments of the present disclosure, the second noise reduction circuit 5 includes a fourth transistor M4, a gate electrode of which is connected to the touch switch end SW, a first electrode of which is connected to the output end Output of the shift register unit, and a second electrode of which is connected to a second potential signal input end VGL.

In some embodiments of the present disclosure, the pull-up circuit 1 includes a first transistor M1 and a third transistor M3, a gate electrode of the first transistor M1 is connected to the starting signal input end Input, a first electrode of the first transistor M1 is connected to a first potential signal input end VDD, a second electrode of the first transistor M1 is connected to the pull-up node PU, a gate electrode of the third transistor M3 is connected to the pull-up node PU, a first electrode of the third transistor M3 is connected to a clock signal end CLK, and a second electrode of the third transistor M3 is connected to the output end Output of the shift register unit.

In some embodiments of the present disclosure, the pull-down circuit 2 includes a second transistor M2, a gate electrode of which is connected to the resetting signal input end Reset, a first electrode of which is connected to a third potential signal input end VSS, and a second electrode of which is connected to the pull-up node PU.

Here, the first potential signal input end VDD, the second potential signal input end VGL and the third potential signal input end VSS may input different signals in accordance with the practical need. In some embodiments of the present disclosure, the first potential signal input end VDD is used to input a high potential signal, the third potential signal input end VSS and the second potential signal input end VGL are used to input low potential signals.

In some embodiments of the present disclosure, the first noise reduction circuit 3 includes a second capacitor C2, a fifth transistor M5, a sixth transistor M6 and a seventh transistor M7. A first end of the second capacitor C2 is connected to the clock signal end CLK, a second end of the second capacitor C2 is connected to a gate electrode of the fifth transistor M5, a gate electrode of the seventh transistor M7 and a first electrode of the sixth transistor M6 at a pull-down node PD, a first electrode of the fifth transistor M5 is connected to the output end Output of the shift register unit, a gate electrode of the sixth transistor M6 is connected to the pull-up node PU, a first electrode of the seventh transistor M7 is connected to the pull-up node PU, and a second electrode of the fifth transistor M5, a second transistor of the sixth transistor M6 and a second transistor of the seventh transistor M7 are connected to the second potential signal input end VGL. Through the first noise reduction circuit 3, it is able to, in the case that the shift register unit has not been scanned yet, prevent the output end Output of the shift register unit from outputting any signal, thereby to prevent the shift register unit from interfering with the other shift register units that are being scanned.

Figure 2:
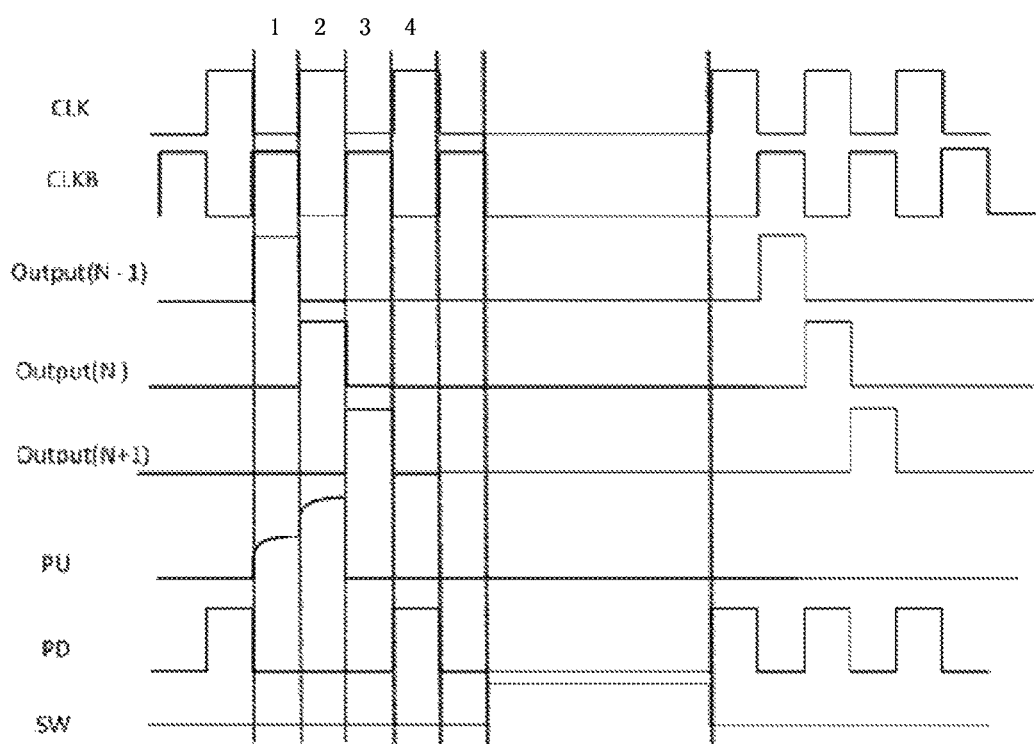
FIG. 2 is a sequence diagram of the shift register unit according to one embodiment of the present disclosure.

Based on the structure of the shift register unit, the present disclosure further provides in some embodiments a method for driving the shift register unit which, as shown in FIG. 2, includes the following steps.

At a first stage, charging, by the pull-up circuit 1, the first capacitor C1 in accordance with a starting signal from a starting signal input end, so as to pull up a potential at the pull-up node PU. At this stage, the starting signal input end Input inputs a high level signal, so as to turn on the first transistor M1. The signal from the starting signal input end Input is just a signal Output (N−1) from the output end Output of the previous-level shift register unit. The clock signal end CLK inputs a low level signal, and the first capacitor C1 is charged by the first potential signal input end VDD via the first transistor M1, so as to pull up the potential at the pull-up node PU. The pull-up node PU is pulled up to be at a high level, so as to turn on the sixth transistor M6, thereby to pull down the pull-down node PD to be at a low level. At this time, the fifth transistor M5 and the seventh transistor M7 are turned off, so as to ensure the stable outputting of a gate driving signal periodically. At this time, the potential at the pull-up node PU is pulled up, so the third transistor M3 is turned on, and the signal from the output end Output is just the signal from the clock signal end CLK, i.e., a low level signal.

At a second stage, after the charging, bootstrapping, by the first capacitor, the potential at the pull-up node continuously, and pulling up, by the pull-up circuit, the potential at the pull-up node PU continuously. At this stage, the touch switch end SW inputs a low level signal (it should be appreciated that, at a display stage, i.e., a scanning and driving stage, the touch switch end SW always inputs the low level signal), so as to turn off the eighth transistor M8 and the fourth transistor M4. The starting signal input end Input inputs a low level signal, so as to turn off the first transistor M1, enable the pull-up node PU to maintain a high level, and enable the third transistor M3 to be in an on state. At this time, the clock signal end CLK inputs a high level signal, and the potential at the pull-node PU increases due to a bootstrapping effect, so that the output end Output outputs a gate driving signal, i.e., a high level signal from the clock signal end CLK. Because the pull-up node PU is at a high level, the sixth transistor M6 is still in the on state, so as to enable the pull-down node PD to maintain a low level, and enable the fifth transistor M5 and the seven transistor M7 to be in an off state, thereby to enable the stable outputting of the gate driving signal.

At a third stage, pulling down, by the pull-down circuit 2, the potential at the pull-down node in accordance with a resetting signal from the resetting signal input end Reset. At this stage, the clock signal end CLK inputs a low level signal, the resetting signal input end Reset inputs a high level signal (the signal from the resetting signal input end Reset is just a signal Output (N+1) from the output end Output of the next-level shift register), so as to enable the second transistor M2 to be in the on state, pull down the potential at the pull-up node PU and turn off the second transistor M3, thereby to prevent the shift register unit from outputting the gate driver signal.

At a fourth stage, performing, by the first noise reduction circuit 3, noise reduction on a signal from the output end Output of the shift register unit. At this stage, the clock signal end CLK inputs a high level signal, so as to pull down the pull-up node PU to be at a low level, enable the sixth transistor M6 to be in the off state and pull up the pull-down node PD to be at a high level through the second capacitor C2. At this time, the fifth transistor M5 is turned on, so as to perform noise reduction on the output end Output of the shift register unit. In addition, the pull-down node PD is at a high level and the seventh transistor M7 is turned on, so as to perform noise reduction on the pull-up node PU.

Through the noise reduction on the output end Output and the pull-up node PU, it is able to eliminate a coupling noise voltage generated by the clock signal end CLK, thereby to enable the shift register unit to output the signal at a low voltage and achieve the stable outputting of the gate driving signal periodically.

At the end of the fourth stage, the method further includes, at a fifth stage, inputting a low level signal by the clock signal end CLK, so as to turn off the sixth transistor M6, pull down the pull-down node PD to be at a low level, and turn off the seventh transistor M7 and the fifth transistor M5.

Before a next frame, the steps at the fourth stage and the fifth stage may be repeated, so as to perform noise reduction on the shift register unit repeatedly.

In some embodiments of the present disclosure, the method further includes, at the touch stage, compensating, by the compensation circuit 4, for the potential at the pull-up node PU in accordance with a touch switch signal from the touch switch end SW, so as to maintain the potential at the pull-up node PU. The step at the touch stage is performed between scanning processes for two adjacent frames. At this stage, the touch switch end SW inputs a high level signal. At this time, the clock signal end CLK inputs a low level signal and the output end Output of the shift register unit outputs a low level signal, so as to maintain the low level at the pull-up node PU and the pull-down node PD as that before the touch stage. In addition, at this stage, the second noise reduction circuit 5 performs noise reduction on the signal from the output end Output of the shift register unit in accordance with the touch switch signal from the touch switch end SW, so as to prevent the output end Output of the shift register unit from outputting any driving signal. Because the touch switch end SW inputs the high level signal, the fourth transistor M4 is turned on, so as to perform the noise reduction on the output end Output, thereby to prevent the shift register unit from outputting the gate driving signal, thereby to prevent the gate driving signal from interfering with the touch signal and ensure the normal touch operation.

The present disclosure further provides in some embodiments another method for driving the shift register unit, which differs from the above-mentioned method in that the step at the touch stage is performed at the end of the first stage during a driving process for any one of the shift register units within one frame.

Figure 3:
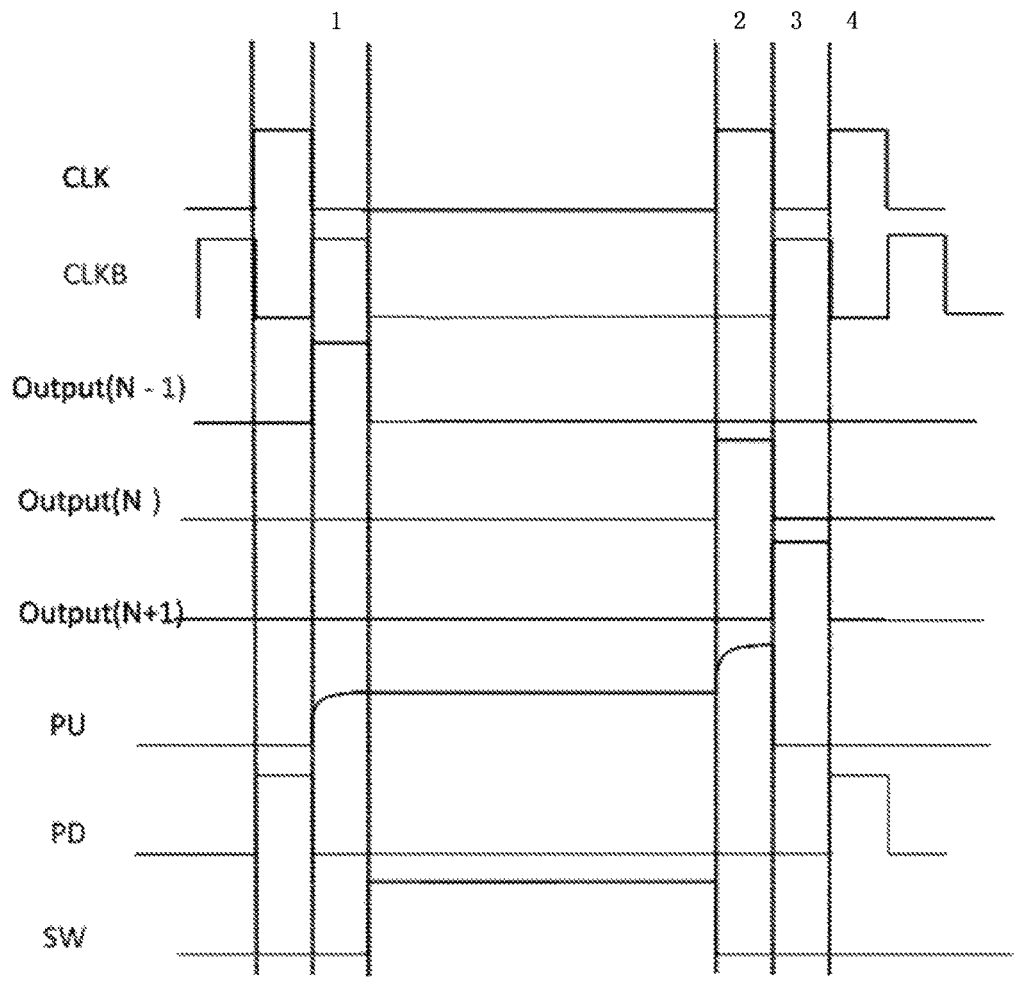
FIG. 3 is another sequence diagram of the shift register unit according to one embodiment of the present disclosure.
Figure 4:
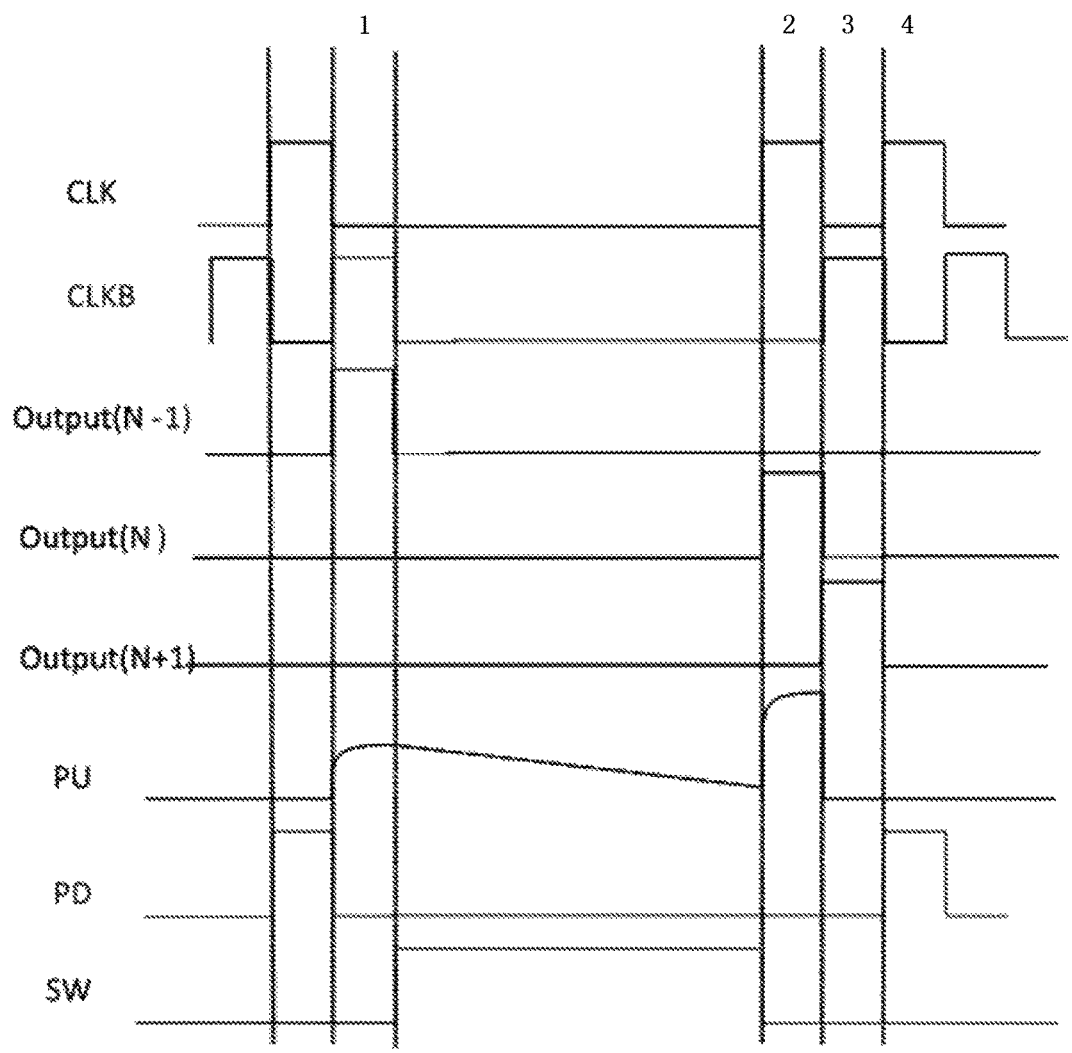
FIG. 4 is a sequence diagram of the shift register unit during the electric leakage at a touch stage according to one embodiment of the present disclosure.

As shown in FIG. 3, after the end of the first stage, the touch switch end SW inputs a high level signal, and the clock signal end CLK outputs a low level, so as to maintain the high level at the pull-up node PU continuously. Because the touch switch end SW is at a high level, the fourth transistor M4 is turned on, so as to perform noise reduction on the output end Output of the shift register unit and prevent the output end Output from outputting any gate driving signal, thereby to prevent the gate driving signal from interfering with the touch signal and ensure the normal touch operation. In addition, the pull-up node PU is at a high level and the touch switch end SW inputs the high level signal, so the eighth transistor M8 and the ninth transistor M9 are turned on and the first capacitor C1 is charged by the touch switch end SW additionally, so as to maintain the potential at the pull-up node PU at the touch stage. In the case that the first capacitor C1 is not charged by the touch switch end SW, the potential at the pull-up node PU may be pulled down due to the electric leakage at the second transistor M2 and the seventh transistor M7 (as shown in FIG. 4). In this regard, after the end of the touch stage, the shift register unit cannot output any signal or may output the signal at an excessively low voltage. Further, at the touch stage, the pull-up nodes PU of the other shift register units are each at a low level, so the subsequent operation of the other shift register units may not be adversely affected. After the touch operation, the touch switch end SW is changed to be at a low level for the operation at the second stage.

The structure of the shift register unit and the other stages for the driving method are identical to those mentioned above, and thus will not be particularly defined herein.

The present disclosure further provides in some embodiments yet another method for driving the shift register unit which differs from those mentioned above in that the step at the touch stage may be performed after the end of the second stage during the driving process for any one of the shift register units within one frame.

Figure 5:
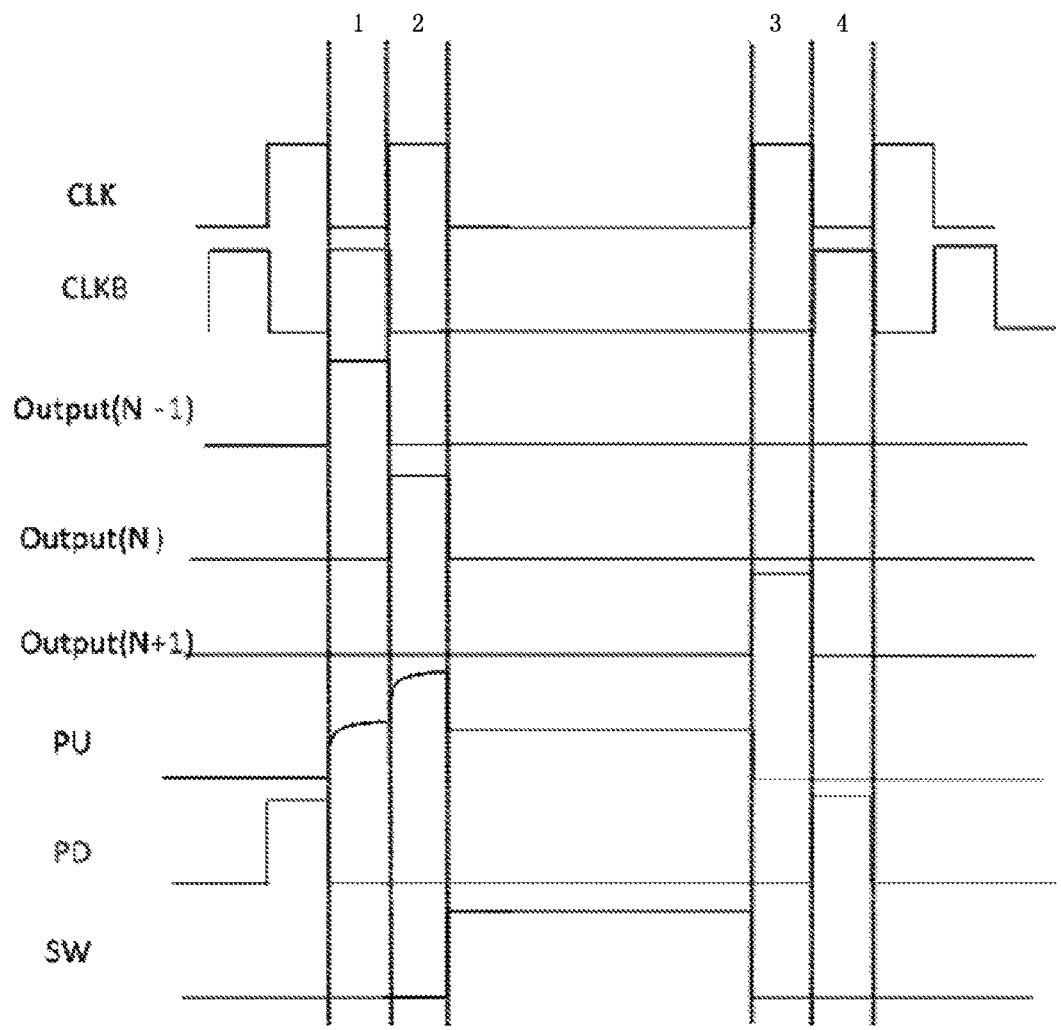
FIG. 5 is yet another sequence diagram of the shift register unit according to one embodiment of the present disclosure.
Figure 6:
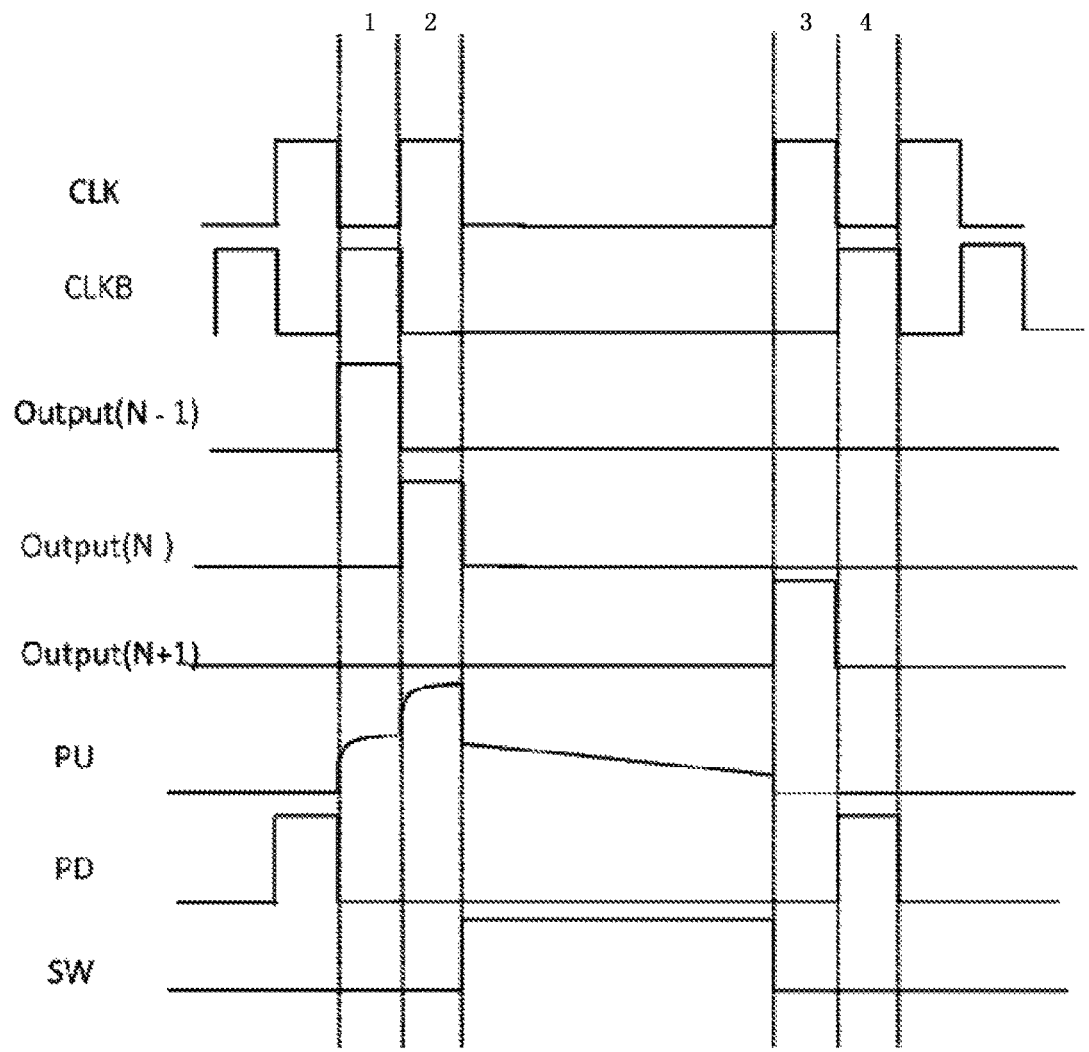
FIG. 6 is another sequence diagram of the shift register unit during the electric leakage at the touch stage according to one embodiment of the present disclosure.

As shown in FIG. 5, after the end of the second stage, the touch switch end SW inputs a high level signal and the clock signal end CLK is changed to be at a low level, so as to maintain the high level at the pull-up node PU continuously. Because the touch switch end SW is at a high level, the fourth transistor M4 is turned on, so as to perform noise reduction on the output end Output of the shift register unit and prevent the output end Output from outputting any gate driving signal, thereby to prevent the gate driving signal from interfering with the touch signal and ensure the normal touch operation. In addition, because the pull-up node PU is at a high level and the touch switch end SW inputs the high level signal, the eighth transistor M8 and the ninth transistor M9 are turned on and the first capacitor C1 is charged by the touch switch end SW additionally, so as to maintain the potential at the pull-up node PU at the touch stage. In the case that the first capacitor C1 is not charged by the touch switch end SW, the potential at the pull-up node PU may be pulled down due to the electric leakage at the second transistor M2 and the seventh transistor M7 (as shown in FIG. 6). In this regard, after the end of the touch stage, the shift register unit cannot output any signal or may output the signal at an excessively low voltage. Further, at the touch stage, the pull-up nodes PU of the other shift register units are each at a high level, so the subsequent operation of the other shift register units may not be adversely affected. After the touch operation, the touch switch end SW is changed to be at a low level for the operation at the third stage.

The structure of the shift register unit and the other stages for the driving method are identical to those mentioned above, and thus will not be particularly defined herein.

According to the shift register unit and its driving method in the embodiments of the present disclosure, the compensation circuit may be used to compensate for the potential at the pull-up node at the touch stage, so as to maintain the potential at the pull-up node at the touch stage. After the end of the touch stage, the scanning process may be performed, so as to prevent the mutual interference between a touch signal and a display signal, thereby to achieve a touch operation and a display operation normally. As a result, it is able to prevent the mutual interference between touch driving and display driving for the Add-in touch panel, thereby to enable the touch driving and the display driving to be compatible with each other.

Figure 7:
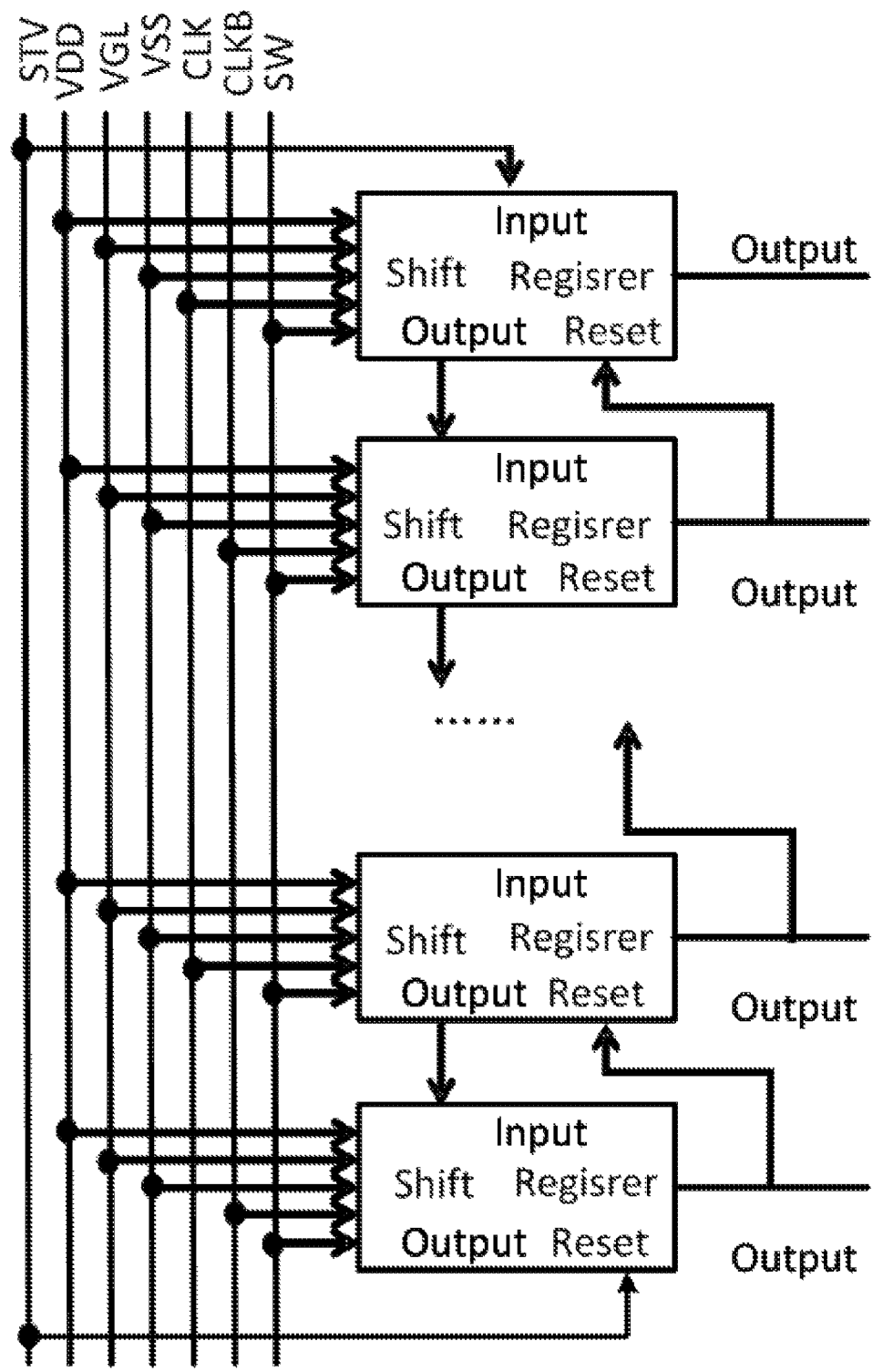
FIG. 7 is a circuit diagram of a gate driver circuit according to one embodiment of the present disclosure.

The present disclosure further provides in some embodiments a gate driver circuit which, as shown in FIG. 7, includes multiple levels of the above-mentioned shift register units. A resetting signal input end Reset of a current-level shift register unit is connected to an output end Output of a next-level shift register unit, and a starting signal input end Input of the current-level shift register unit is connected to an output end Output of a previous-level shift register unit.

In some embodiments of the present disclosure, a starting signal input end Input of a first-level shift register unit and a resetting signal input end Reset of a last-level shift register unit are connected to a triggering signal input end STV, and the triggering signal input end STV is configured to input a starting triggering signal to the starting signal input end Input of the first-level shift register unit and input a resetting triggering signal to the resetting signal input end Reset of the last-level shift register unit.

It should be appreciated that, the starting signal input end Input of the shift register unit is configured to input a resetting signal during backward scanning, and the resetting signal input end Reset of the shift register unit is configured to input a starting signal during the backward scanning. During the backward scanning, the first potential signal input end VDD inputs a low level signal and the second potential signal input end VGL inputs a high level signal, without any change in the circuit connection relationship.

Through the above configuration, it is able for the gate driver circuit to perform bi-directional scanning. In other words, the gate driver circuit may be used to perform the scanning from the first-level shift register unit to the last-level shift register unit, or from the last-level shift register unit to the first-level shift register. During the backward scanning, the potentials inputted by the first potential signal input end and the second potential signal input end are each of a phase reverse to those during forward scanning.

It should be further appreciated that, the clock signal ends CLK of the shift register units may each be connected with a CLK signal or a CLKB signal having a phase reverse to the CLK signal according to the practical need.

According to the gate driver circuit in the embodiments of the present disclosure, it is able to prevent the mutual interference between touch driving and display driving for the Add-in touch panel, thereby to enable the touch driving and the display driving to be compatible with each other.

The present disclosure further provides in some embodiments a display device including the above-mentioned gate driver circuit. Through the gate driver circuit, it is able to prevent the mutual interference between touch driving and display driving for the Add-in touch panel, thereby to enable the touch driving and the display driving to be compatible with each other.

The display device may be any product or member having a display function such as a mobile phone, a flat-panel computer, a television, a display, a laptop computer, a digital photo frame or a navigator.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A shift register unit, comprising a pull-up circuit, a pull-down circuit, a first capacitor, a first noise reduction circuit, and a compensation circuit,
   wherein first ends of the pull-up circuit, the pull-down circuit, the first noise reduction circuit, the compensation circuit and the first capacitor are connected to a pull-up node, and second ends of the pull-up circuit, the first noise reduction circuit and the first capacitor are connected to an output end of the shift register unit;

the pull-up circuit is configured to pull up a potential at the pull-up node in accordance with a starting signal from a starting signal input end;

the pull-down circuit is configured to pull down the potential at the pull-up node in accordance with a resetting signal from a resetting signal input end;

the first capacitor is configured to bootstrap the potential at the pull-up node at a pull-up stage;

the first noise reduction circuit is configured to perform noise reduction on a signal from the output end of the shift register unit at a pull-down stage; and the compensation circuit is configured to compensate for the potential at the pull-up node at a touch stage in accordance with a touch switch signal from a touch switch end, and the compensation circuit comprises an eighth transistor and a ninth transistor, a gate electrode and a first electrode of the ninth transistor are connected to the pull-up node, a second electrode of the ninth transistor is connected to a second electrode of the eighth transistor, and a gate electrode and a first electrode of the eighth transistor are connected to the touch switch end.

2. The shift register unit according to claim 1, further comprising a second noise reduction circuit connected to the first noise reduction circuit and the output end of the shift register unit, and configured to perform noise reduction on the signal from the output end of the shift register unit at the touch stage in accordance with the touch switch signal from the touch switch end.

3. The shift register unit according to claim 2, wherein the second noise reduction circuit comprises a fourth transistor, a gate electrode of which is connected to the touch switch end, a first electrode of which is connected to the output end of the shift register unit, and a second electrode of which is connected to a second potential signal input end.

4. The shift register unit according to claim 1, wherein the pull-up circuit comprises a first transistor and a third transistor, a gate electrode of the first transistor is connected to the starting signal input end, a first electrode of the first transistor is connected to a first potential signal input end, a second electrode of the first transistor is connected to the pull-up node, a gate electrode of the third transistor is connected to the pull-up node, a first electrode of the third transistor is connected to a clock signal end, and a second electrode of the third transistor is connected to the output end of the shift register unit.

5. The shift register unit according to claim 1, wherein the pull-down circuit comprises a second transistor, a gate electrode of which is connected to the resetting signal input end, a first electrode of which is connected to a third potential signal input end, and a second electrode of which is connected to the pull-up node.

6. The shift register unit according to claim 1, wherein the first noise reduction circuit comprises a second capacitor, a fifth transistor, a sixth transistor and a seventh transistor, a first end of the second capacitor is connected to a clock signal end, a second end of the second capacitor is connected to a gate electrode of the fifth transistor, a gate electrode of the seventh transistor and a first electrode of the sixth transistor at a pull-down node, a first electrode of the fifth transistor is connected to the output end of the shift register unit, a gate electrode of the sixth transistor is connected to the pull-up node, a first electrode of the seventh transistor is connected to the pull-up node, and a second electrode of the fifth transistor, a second transistor of the sixth transistor and a second transistor of the seventh transistor are connected to the second potential signal input end.

7. A gate driver circuit, comprising multiple levels of the shift register units according to claim 1, wherein a resetting signal input end of a current-level shift register unit is connected to an output end of a next-level shift register unit, and a starting signal input end of the current-level shift register unit is connected to an output end of a previous-level shift register unit.

8. The gate driver circuit according to claim 7, wherein a starting signal input end of a first-level shift register unit and a resetting signal input end of a last-level shift register unit are connected to a triggering signal input end, and the triggering signal input end is configured to input a starting triggering signal to the starting signal input end of the first-level shift register unit and input a resetting triggering signal to the resetting signal input end of the last-level shift register unit.

9. The gate driver circuit according to claim 7, wherein during backward scanning, the starting signal input end of the shift register unit is configured to input a resetting signal, the resetting signal input end of the shift register unit is configured to input a starting signal, and potentials inputted by a first potential signal input end and a second potential signal input end are each of a phase reverse to those during forward scanning.

10. A display device, comprising the gate driver circuit according to claim 7.

11. A method for driving the shift register unit according to claim 1, comprising steps of:

at a first stage, charging, by a pull-up circuit, a first capacitor in accordance with a starting signal from a starting signal input end, so as to pull up a potential at a pull-up node;

at a second stage, after the charging, bootstrapping, by the first capacitor, the potential at the pull-up node continuously, and pulling up, by the pull-up circuit, a signal from an output end of the shift register unit continuously;

at a third stage, pulling down, by a pull-down circuit, a potential at a pull-down node in accordance with a resetting signal from a resetting signal input end;

at a fourth stage, performing, by a first noise reduction circuit, noise reduction on a signal from the output end of the shift register unit; and at a touch stage, compensating, by a compensation circuit, for the potential at the pull-up node in accordance with a touch switch signal from a touch switch end, so as to maintain the potential at the pull-up node.

12. The method according to claim 11, wherein the shift register unit further comprises a second noise reduction circuit, and at the touch stage, the method further comprises performing, by the second noise reduction circuit, the signal from the output end of the shift register unit in accordance with the touch switch signal from the touch switch end, so as to prevent the output end of the shift register unit from outputting a driving signal.

13. The method according to claim 11, wherein after the end of the fourth stage, the method further comprises, at a fifth stage, inputting, by a clock signal end, a low level signal so as to pull down a pull-down node to be at a low level.

14. The method according to claim 13, further comprising, before a next frame, repeating the operations at the fourth stage and the fifth stage by the shift register unit.

15. The method according to claim 11, wherein at the touch stage, the method further comprises compensating, by the compensation circuit, for the potential at the pull-up node in accordance with the touch switch signal from the touch switch end, so as to maintain the potential at the pull-up node.

16. The method according to claim 11, wherein the step at the touch stage is performed between scanning processes for two adjacent frames.

17. The method according to claim 11, wherein the step at the touch stage is performed between the steps at the first stage and the second stage during a driving process for any one of the shift register units within one frame.

18. The method according to claim 11, wherein the step at the touch stage is performed between the steps at the second stage and the third stage during a driving process for any one of the shift register units within one frame.

* * * * *